United States Patent

Kawanami et al.

[11] Patent Number: 5,111,520
[45] Date of Patent: May 5, 1992

[54] OPTICAL FIBER CONNECTOR TERMINAL

[75] Inventors: Norihide Kawanami; Kinjiro Okada, both of Tokyo; Nobuaki Kobayashi; Kimio Masuda, both of Ueda, all of Japan

[73] Assignee: Hirose Electric Co., Ltd., Tokyo, Japan

[21] Appl. No.: 659,074

[22] Filed: Feb. 22, 1991

[30] Foreign Application Priority Data

May 16, 1990 [JP] Japan ................................. 2-124018

[51] Int. Cl.$^5$ ............................................. G02B 6/26
[52] U.S. Cl. ......................................... 385/81; 385/80; 385/84; 385/85
[58] Field of Search ................ 350/96.20, 96.21, 96.22, 350/96.23; 385/80, 81, 82, 84, 85, 62, 64, 66

[56] References Cited

U.S. PATENT DOCUMENTS

| 4,183,619 | 1/1980 | Makuch | 385/82 |
| 4,448,482 | 5/1984 | Lathlaen | 385/64 |
| 4,668,045 | 5/1987 | Melman et al. | 385/82 |
| 4,693,550 | 9/1987 | Brown et al. | 385/81 |
| 4,696,537 | 9/1987 | Bauer et al. | 385/81 |
| 4,725,118 | 2/1988 | Serrander | 385/82 |
| 4,728,171 | 3/1988 | Schofield et al. | 385/81 |
| 4,815,808 | 3/1989 | Honma et al. | 385/81 |
| 4,887,875 | 12/1989 | Chang et al. | 385/81 |
| 4,902,090 | 2/1990 | Tanaka et al. | 385/81 |

Primary Examiner—Brian Healy
Attorney, Agent, or Firm—Kanesaka & Takeuchi

[57] ABSTRACT

An optical fiber connector terminal includes a sleeve (6); a plurality of collet members (7) disposed around a center within the sleeve to form a receiving aperture (9); and an optical fiber (10) inserted into and bonded to the receiving aperture.

5 Claims, 6 Drawing Sheets

OPTICAL FIBER CONNECTOR TERMINAL

BACKGROUND OF THE INVENTION

1. Field of the Invention

The present invention relates to optical fiber connector terminals for closely connecting cords or cables of optical fibers within an adapter for communications systems, data transmission systems, and other optical systems.

2. Description of the Prior Art

In optical fiber transmission lines, the connection between optical fibers is critical. The connection of optical fibers requires a precise registration of optical fibers. Optical fibers are made from glass and have a diameter of 100 microns. There are two requirements for the connector terminals; protecting and reinforcing the optical fibers and registering optical fibers with high-precisions in the order of micrometers.

In an attempt to satisfy such requirements, an optical fiber connector terminal such as shown in FIG. 23 has been proposed. This connector terminal includes a terminal body 40 which is made from zirconia ceramic. The terminal body 40 is made by molding a terminal body which is slightly larger than the finished product, sintering it at high temperatures, and grinding a receiving aperture 41 with a wrapping wire or the like to the desired size. The terminal body 40 is then press fitted into a support member 42.

However, it is very difficult to make a long core pin of the mold for the receiving aperture 41 so that it is very difficult to make a thin long receiving aperture 41 which is longer than 10 mm. For this reason, the strength of an optical fiber bonded to the conventional receiving aperture 41 is so small that the finished product is not reliable.

The zirconia ceramic materials require sintering at high temperatures, making the manufacturing process complex and difficult, resulting in the low yield. In addition, thin connector terminals between 1.0 and 1.5 mm in diameter have low bending resistance and are easy to break upon connection and disconnection.

Even if the connector terminal is made from a metal, it is extremely difficult to make a thin long receiving aperture in the connector terminal. Moreover, the terminal body 40 and the support member 42, which are made from different materials, are not compatible and can break upon forcible connection.

SUMMARY OF THE INVENTION

Accordingly, it is an object of the invention to provide an optical fiber connector terminal having a fine long aperture in which an optical fiber is bonded, thereby providing a reliable optical fiber connector terminal.

According to an aspect of the invention there is provided an optical fiber connector terminal which includes a sleeve; a plurality of collet members disposed equidistance from a center within the sleeve to form a receiving aperture; and an optical fiber inserted into and bonded to the receiving aperture.

In the above connector terminal, the sleeve and the collet members are integrated so that the collet members form a thin long receiving aperture, thereby providing a long connector terminal. This increases the bonding strength of an optical fiber to the receiving aperture and thus the connector reliability.

The above and other objects, features, and advantages of the invention will become more apparent from the following description when taken in conjunction with the accompanying drawings.

DESCRIPTION OF THE PREFERRED EMBODIMENT

Figure 1:
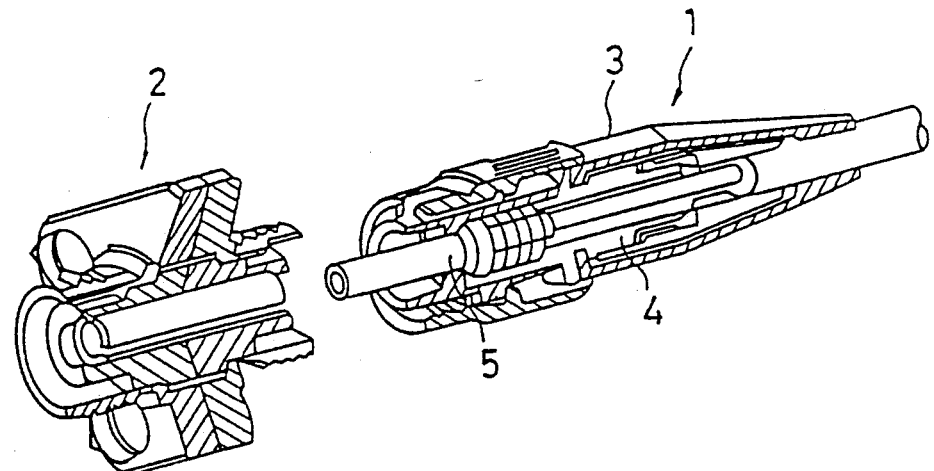
FIG. 1 is a partially cutaway perspective view of an optical fiber connector having a connector terminal according to an embodiment of the invention.
Figure 2:
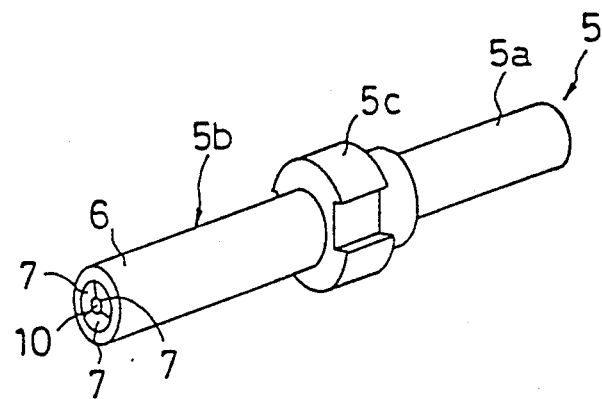
FIG. 2 is a perspective view of the connector terminal of FIG. 1.
Figure 3:
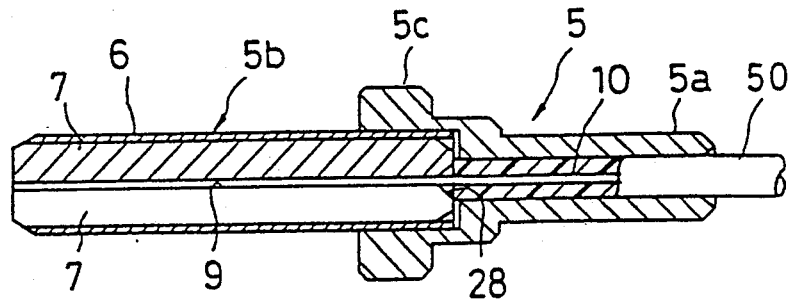
FIG. 3 is a longitudinal section of the connector terminal of FIG. 2.
Figure 4:
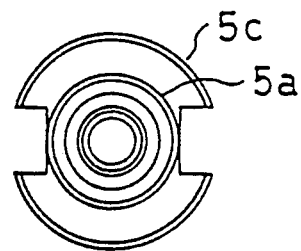
FIG. 4 is a rear view of the connector terminal of FIG. 2.

In FIG. 1, the optical fiber connector includes a plug 1 and an adapter 2. The plug 1 has a plug housing 3 for housing an optical fiber connector terminal 5 via a retainer fixture 4.

Figure 5:
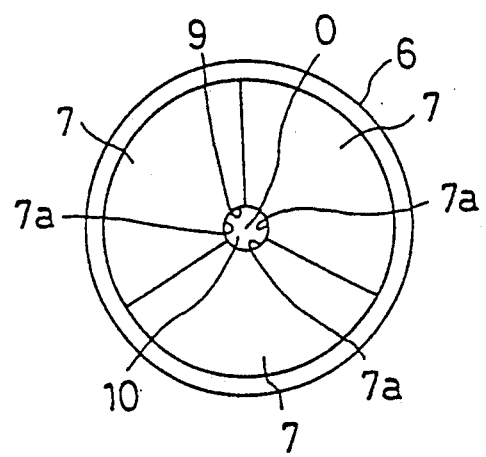
FIG. 5 is a front view of a terminal body of the connector terminal of FIG. 2.
Figure 6:
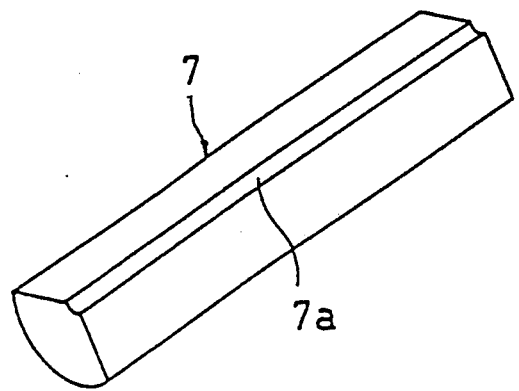
FIG. 6 is a perspective view of a collet member useful for the connector terminal of FIG. 2.

As FIGS. 2-5 show, the connector terminal 5 consists of a support member 5a with a flange 5c and a terminal body 5b attached to the support member 5a. The terminal body 5b has a sleeve 6 in which three collet members 7 are placed around the center O. These collet members 7 are made by dividing into three equal circular portions a pin member which has a diameter substantially equal to the inside diameter of the sleeve 6. As best shown in FIG. 6, the collet member 7 has a groove 7a so that the three collet members 7 disposed around the center O form a receiving aperture 9 for an optical fiber 10 as shown in FIG. 5. The collet members 7 are made from tempered or hardened stainless steel such as SUS 305 while the sleeve 6 is made from stainless steel which is not hardened. Consequently, the hardness of the sleeve 6 is less than that of the collet members 7. The sleeve 6 is subjected to a rotary forging process in a rotary swage, for example, to be reduced in diameter so that the collet members 7 are disposed equidistance from a center O, thereby placing the receiving aperture 9 at the center O. An optical fiber 10 of an optical cable 50 is inserted and bonded to the receiving aperture 9.

A method of making such an optical fiber connector terminal 5 will be described below with reference to FIGS. 7–20.

Figure 7:
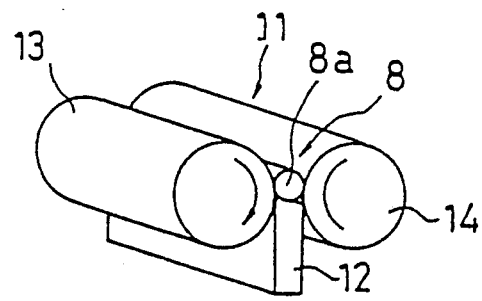
FIG. 7 is a perspective view showing how to grind a pin useful for the connector terminal of FIG. 2.

In FIG. 7, a pin material 8a of stainless steel is cut to a predetermined length (for example, 60 mm), subjected to a heat treatment or hardening process, and ground in a grinder 11 to form a pin member 8 which has a predetermined degree of circularity and a predetermined degree of surface smoothness. The grinder 11 consists of a support member 12 for supporting the pin material 8a and a pair of grinding rollers 13 and 14, which rotate in opposite directions shown by arrows to grind the pin material 8a. Thus, the pin member 8 is made from a hardened stainless steel material (for example, SUS 305).

Figure 8:
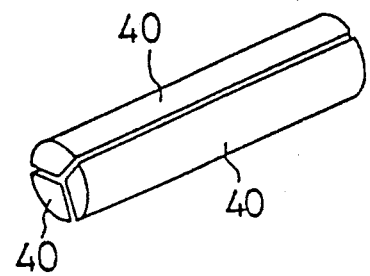
FIG. 8 is a perspective view of a collet for the connector terminal of FIG. 2.

In FIG. 8, the pin member 8 is divided into three equal segments of a circle, forming three collet materials 40.

Figure 9:
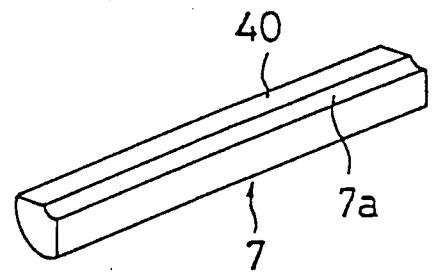
FIG. 9 is a perspective view of a collet member for the connector terminal of FIG. 2.

In FIG. 9, a groove 7a is formed at the inner ridge of each collet member to provide a collet member 7.

Alternatively, a circular aperture is made in the pin member 8 and, then, the pin member 8 is divided into three collet members 7.

Figure 10:
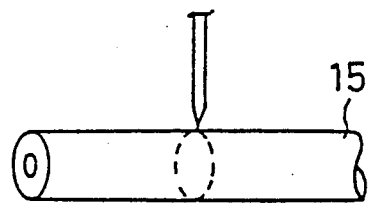
FIG. 10 shows how to cut a pipe for making a sleeve for the connector terminal of FIG. 2.

In FIG. 10, a stainless steel pipe 15 is cut to a predetermined length.

Figure 11:
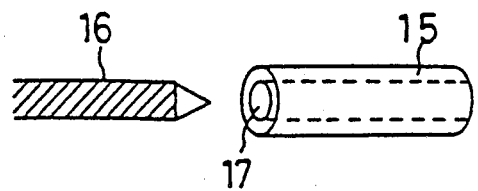
FIG. 11 shows how to make a specified inner diameter in the sleeve.

In FIG. 11, an opening 17 of a specified inner diameter is made with a drill 16 or the like. Unlike the pin 7, the resulting sleeve 6 is made from stainless steel which is not hardened so that its hardness is less than that of the collet members 7.

Figures 12, 13:
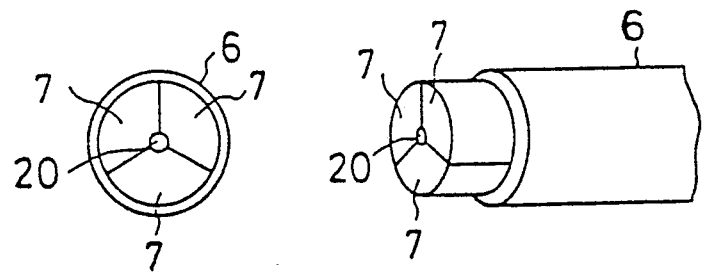
FIGS. 12 and 13 show three collect members placed in the sleeve.

In FIGS. 12 and 13, three collet members 7 are disposed within the sleeve 6 so that the grooves 7a form a substantially circular aperture 20 at the center for receiving an optical fiber. The sleeve 6 having the three collet members 7 therein is subjected to a rotary forging process, for example, in a rotary swage to reduce the diameter. The rotary forging process is a process by which the sleeve 6 is struck by one or two pairs of forging dies under continuous or intermittent rotation about its axis, thereby forming a connector terminal material A. The rotary forging process reduces the sleeve 6 in diameter to compress the collet members 7 toward the center O, thereby disposing the three collet members 7 equidistance from the center O and the receiving aperture 9 at the center O.

Figure 14:
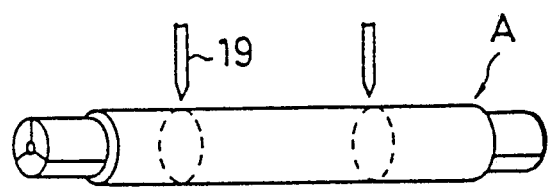
FIG. 14 shows how to cut off end portions of the connector terminal material.

In FIG. 14, opposite end portions of the connector terminal material A are cut off with a pair of fine cutters 19. The cutting surfaces are smoothed and cleaned.

Figure 15:
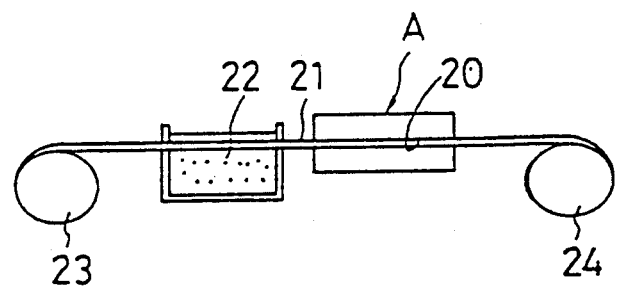
FIG. 15 illustrates how to wrap the triangular aperture to form a circular receiving aperture.

In FIG. 15, a wrapping wire 21 is put through the substantially circular aperture 20. Grinding diamond granules 22 are put on the wrapping wire 21. A pair of reels 23 and 24 are turned back and forth to reciprocate the wrapping wire 21 to grind the wall of the receiving aperture 20.

Figure 16:
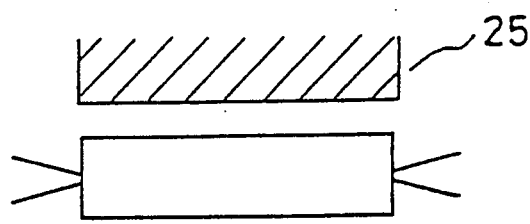
FIG. 16 shows how to grind the circumference of the connector terminal material with a cylindrical grinder.

In FIG. 16, the outside of the connector terminal material A is polished with a cylindrical grinder 25 to provide the desired degree of concentricity.

Figure 17:
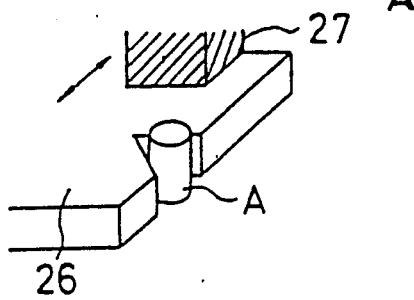
FIG. 17 illustrates how to polish an end of the connector terminal material.

In FIG. 17, an end surface of the terminal material A is polished with a grinder 27 while being held in place with a holder 26 to provide a right angled end surface.

Figure 18:
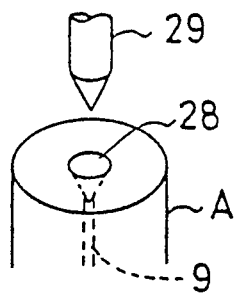
FIG. 18 shows how to make a guide surface in the receiving aperture.

In FIG. 18, a guiding surface 28 is made at an end of the receiving aperture 9 by an electric discharge process using an electrode 29. Alternatively, the guiding surface 28 may be made by a cutting process.

Figure 19:
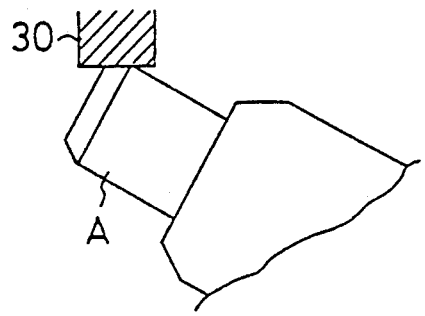
FIG. 19 illustrates how to round a corner of the connector terminal material.

In FIG. 19, an end of the terminal material A is ground with a grinder 30 to provide a rounded corner. The terminal material A is then cleaned and press fitted into a support member 5a for integration.

Figure 20:
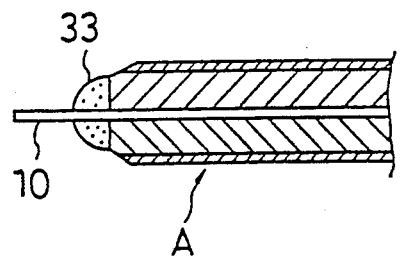
FIG. 20 is a longitudinal section of the connector terminal material in which an optical fiber is bonded.

In FIG. 20, an adhesive 33 is put in the receiving aperture 9, and an optical fiber 10 is put through the receiving aperture 9, thereby building up the adhesive 33 at the end surface so that the projected portion of the optical fiber 10 is also bonded. The built up adhesive 33 and the projected optical fiber 10 are ground off with a grinder to provide a connector terminal 5.

Figure 21:
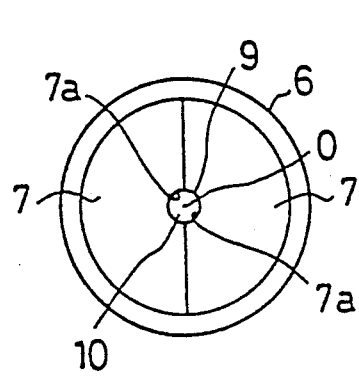
FIGS. 21 and 22 are end views of connector terminals according to embodiments of the invention.

In FIG. 21, two collet members 7 replace the three collet members 7 in the above embodiment to form a receiving aperture 9 which is substantially the same as that of the above embodiment.

Figure 22:
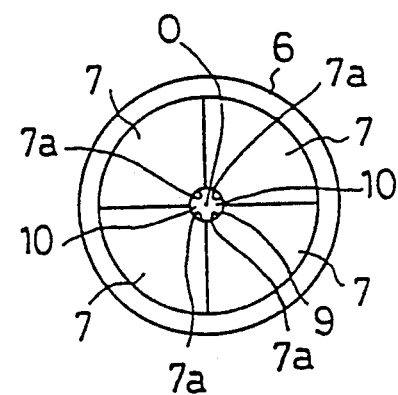
Figure 23:
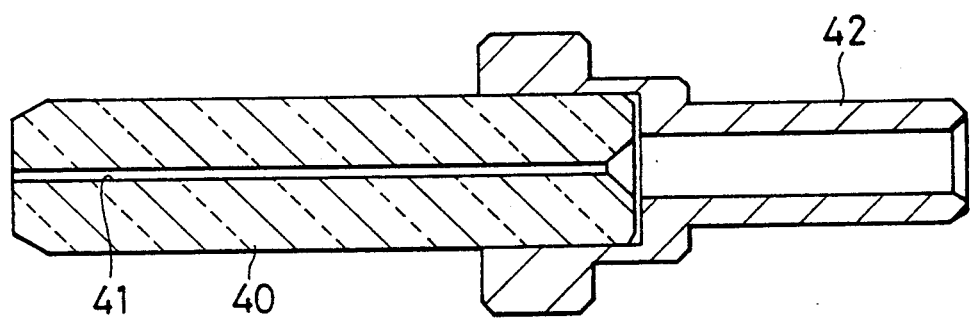
FIG. 23 is longitudinal section of a conventional connector terminal.

In FIG. 22, four collet members 7 replace the three collet members 7 in the embodiment of FIG. 5 to provide a receiving aperture 9 which is substantially the same as that of the embodiment of FIG. 5.

The sleeve 6 made from stainless steel which is not hardened may be made from tungsten or beryllium as far as their hardness is less than that of the collet members 7 which are made from hardened stainless steel such as SUS 305. The sleeve 6 having the collet members 7 is reduced in diameter by a rotary forging in a rotary swage in the above embodiment, but the same results may be obtained by a drawing or press machine for pressing the collet members 7 toward the center O. It is noted that the number of collet members are not limited to two, three, and four as shown in the above embodiments.

We claim:

1. An optical fiber connector terminal comprising:
   a sleeve made from a first metallic material;
   a plurality of separate collet members made of a second metallic material disposed equidistance from a center within said sleeve to define a receiving aperture; and
   an optical fiber inserted into and bonded to said receiving aperture;
   said collet members having a hardness greater than that of said sleeve so that when said sleeve is reduced in diameter, said sleeve collapses to fill spaces between said sleeve and said collet members.

2. The optical fiber connector terminal of claim 1, wherein said plurality of collet members are three collet members.

3. The optical fiber connector terminal of claim 1, wherein said plurality of collet member are two collet members.

4. The optical fiber connector terminal of claim 1, wherein said plurality of collet members are four collet members.

5. The optical fiber connector terminal of claim 1, steel while said sleeve is made from stainless steel which is not hardened.